C. B. COTTON.
METHOD OF AND APPARATUS FOR GINNING COTTON.
APPLICATION FILED JULY 26, 1916.
1,234,092.
Patented July 17, 1917.
2 SHEETS—SHEET 1.
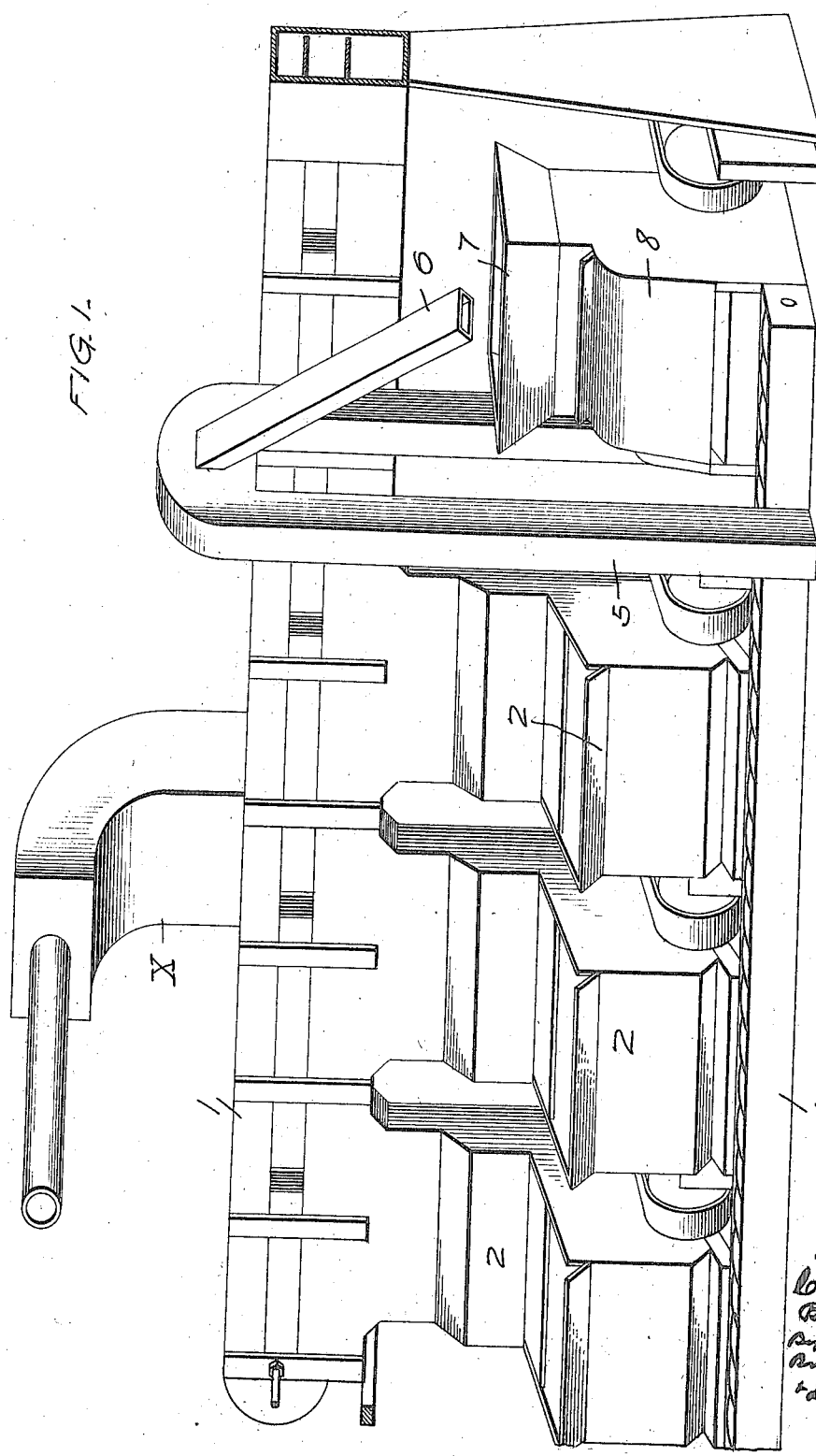

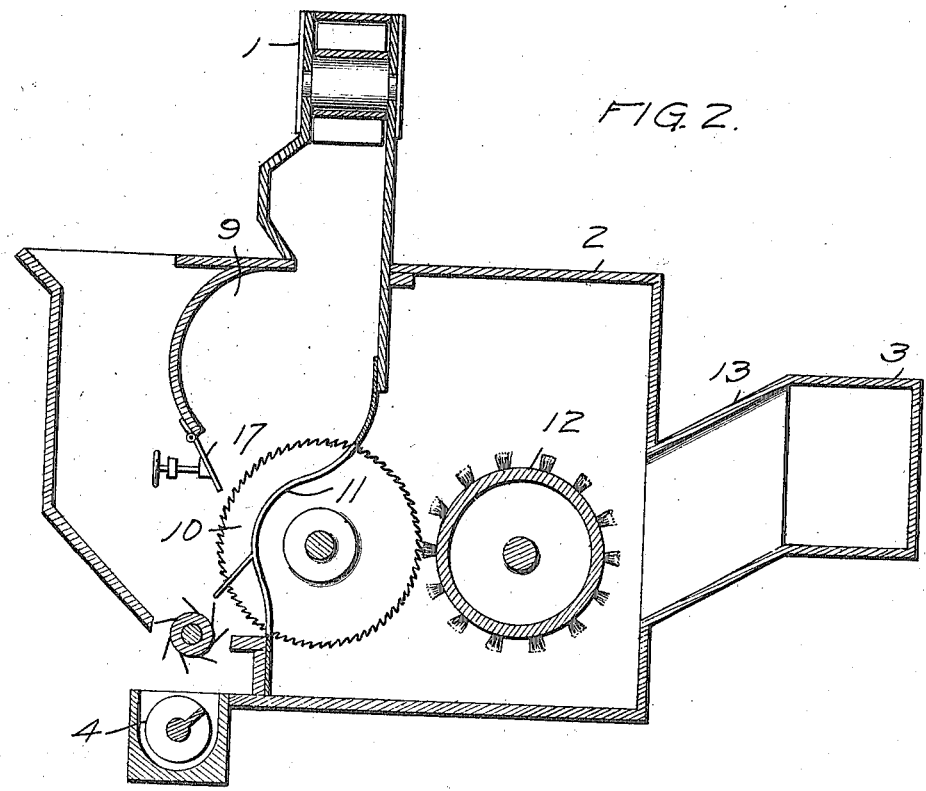
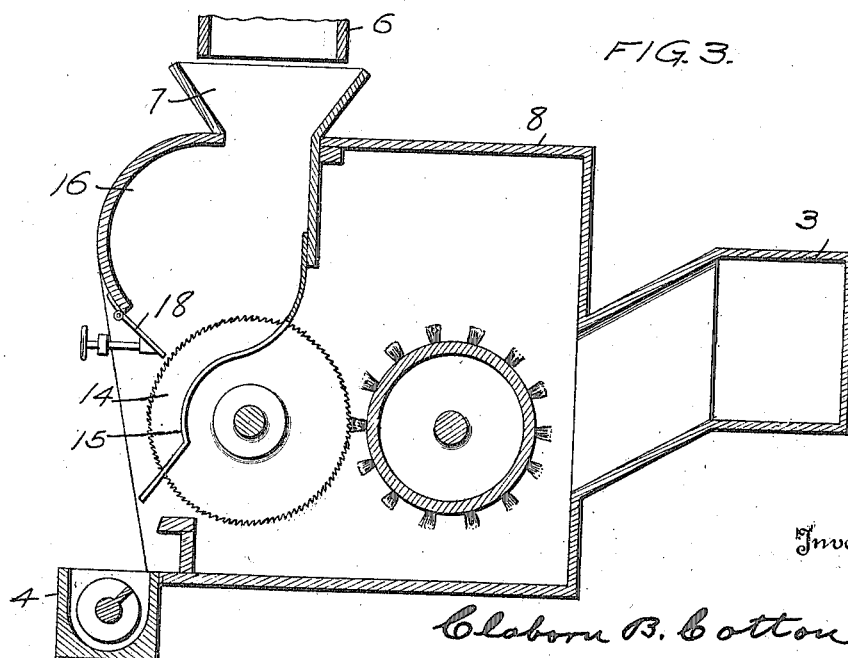

UNITED STATES PATENT OFFICE.

CLABORN B. COTTON, OF DARDANELLE, ARKANSAS, ASSIGNOR OF ONE-HALF TO GEORGE FORREST SPROULL, OF MEMPHIS, TENNESSEE.

METHOD OF AND APPARATUS FOR GINNING COTTON.

1,234,092.   Specification of Letters Patent.   Patented July 17, 1917.

Application filed July 26, 1916. Serial No. 111,457.

*To all whom it may concern:*

Be it known that I, CLABORN B. COTTON, a citizen of the United States, residing at Dardanelle, Yell county, and State of Arkansas, have invented and discovered certain new and useful Improvements in Methods of and Apparatus for Ginning Cotton, of which the following is a specification.

The present invention relates to a method of and apparatus for ginning cotton, and has for its purpose to more thoroughly gin cotton from the seed with the present used apparatus, in a manner which will be less wasteful than the process now employed and, at the same time, preserve the length and body of the fiber, the same being a more complete disclosure of that method and apparatus substantially as disclosed in my copending application, Serial No. 31,515, filed June 1, 1915.

The invention has for its purpose to provide an arrangement of apparatus which employs a linter machine with a group of ginning machines, having a common means for transferring the partially ginned seed cotton from the several machines to the linter, and carrying off the lint from the linter and the fiber from the gins in one and the same flue to the condenser.

In ginning, as ordinarily practised, the seed cotton is fed, by a feeder, to a saw gin which pulls the fiber from the seed, the fiber being blown out into a condenser, and the cleaned seed is delivered beneath the gin. The seed cotton is fed to the roll holder of the gin and becomes part of a revolving roll of partially ginned cotton which is kept in rotation by the motion of the saws that continually draw the fiber from the lower rear side of the roll box between the ribs of the gin. The ginned seed falls out through the roll and escapes through the opening at the bottom of the roll box and through the fingers of the seed board.

This method of ginning cotton is attended by the practical difficulties that, in order to insure the recovery of the maximum quantity possible to remove with gins, it is necessary to so construct and adjust the roll box and seed board as will maintain a tight roll of partially ginned cotton, with the result that the action of the saws is hampered and the staple, or fiber, is damaged by the saws rotating at a rapid rate of speed through the tight roll and cutting a portion of the fiber, thereby reducing its market value. This action leaves on the seed a portion of merchantable fiber which the gin saws are unable to separate without further damage to the staple.

The process disclosed herein will obtain from four per cent. to eight per cent. more lint, or fiber, from the seed than by the present method, and is based upon the discovery that the ginning operation may be successfully sub-divided, to wit, by subjecting the seed cotton to a first ginning while in an exceedingly loose or open roll, and then subjecting the partially ginned seeds that fall therefrom to a second ginning on an altered or adjusted linter machine gin and ginning in a very loose roll. The two operations are, or may be, performed with the combination of any ordinary gin and ordinary linter machine now in use for ginning cotton and delinting the cotton seed, the only necessary difference being that the roll box of the gin performing the first operation shall be so adjusted as to maintain the roll in a very loose and open condition, and the roll box of the linter has a like adjustment.

A suitable apparatus for carrying out these operations is illustrated in the accompanying drawings, wherein—

Figure 1 is a perspective view of a series of gins for primarily ginning the cotton, a linter for further finishing the seeds discharged from the gins, and suitable feeding and discharging apparatus therefor, Fig. 2 a vertical transverse section, on an enlarged scale, of one of the gins for primarily ginning the cotton, and Fig. 3 a similar view of the linter.

Referring to the apparatus in more detail, 1 designates a suitable conveyer for delivering the seed cotton from the feeder X to the several gins 2 for the primary ginning, and the fiber from the several gins is discharged into the flue 3 after the ordinary manner (see Fig. 2). The partially ginned seeds from the first ginning operation are delivered at the seed outlets of the several gins into a screw conveyer 4 that discharges into an elevator, or bucket conveyer 5, which, in turn, empties the seeds into the chute 6 of the hopper 7 above the linter 8. And said linter discharges the lint into the flue 3 where it commingles and is carried off with the cotton from the gins to the usual condenser.

Each of the gins 2 is of ordinary and well-known construction, having the usual roll holder or breast 9, the gang of saws 10, grate 11, and brush 12, for delivering the fiber from the saws and blowing it out through the chute 13 into the flue 3. The roll box has a plate 17 adjustably mounted thereon. The linter is very similar to the regular cotton gin ordinarily used for delinting or removing all the fur and gin-cut fiber which remains on the seed after the gin is through the same, and preparatory to crushing and having the cotton seed oil extracted. It differs from the ordinary gin, however, in that the saws 14 are arranged more closely together, the ribs of the grate 15 are more narrow, the opening between the ribs smaller, and the feeder roll 16 and feeder are of different construction on account of being adapted for the feeding of cotton seed instead of cotton. The roll box of the linter has an adjustable or regulating plate 18.

The present method of removing the gin-cut fiber and cotton seed fur from the seed is very much the same as with the gin. In the operation of the linter machine, the seed, being fed to the roll holder of the linter, becomes a part of a revolving roll of partially ginned and linted seed which is kept in rotation by the motion of the saws and other means, and which saws will continue to draw gin-cut fiber and seed fur from the lower rear side of the roll, between the bars of the grate. The delinted seed will fall out through the roll and escape through the opening of the roll box and on to the screw conveyer 4, whence it is discharged into a suitable receiver.

It is the purpose of the linter to remove every particle of substance left on the seed by the gin and, if possible, to make the seed "slick and smooth" without regard to the quality of the substance removed, to the end of having the seed in the best possible condition for the crushing and extracting of the cotton seed oil. To effectively clean the seed, it is necessary that the same be held in a very compact roll so as to be closely and tightly pressed against the saws. The linter machine is devised to hold the seed in this position until it is cleaned of all fiber, allowing only about six tons to pass through in twenty-four hours, in actual operation.

The invention disclosed herein involves, as its distinctive features, the ginning of seed cotton by first subjecting it to the ginning action of saws while maintained in a loose or open roll, so loose and open that the saws can pull from the seed the fiber without injuring it. The seed board of the gin is opened very wide, and in most instances removed entirely, to allow the partially ginned seed to drop from the roll as soon as the small amount of fiber remaining will permit. The seeds, when thus partially stripped or denuded of fiber, are passed to the linter. The partly ginned seed, resulting from the first operation, is then subjected to a second ginning or linting operation and, at the same time, still maintained in the condition of a loose roll, its looseness being such as will not permit of cutting any of the fiber left on the seed and allowing the seed to escape as soon as the merchantable lint is removed, and also before the seed fur is allowed to be taken from the seed.

By this process, the difficulties of removing all the fiber from the seed are overcome, and the staple, which is drawn freely and easily from the seed, is left in perfect condition. The larger portion of the fiber is removed from the seed in the first ginning process. It has also been found, from experience, that the loose roll, instead of increasing the rapidity of ginning, slightly decreases it. Where the seed are to be fed to the linter at a fast rate, it is necessary to first change the feeding device to enable it to feed to the saws at a rate of as much as twenty tons or more of partly ginned seed in approximately twenty-four hours, and to do this, the throat, through which the seed pass to the saws, must be enlarged, and also the feed roll, instead of running about one and one-half revolutions per minute, must run at about nine revolutions per minute.

It has been discovered that there is no short fiber on the cotton seed, as by brushing the fiber out, all are practically of the same length, there being only a very slight difference, and the fiber on the little end of the seed is a trifle shorter than that on the sides, which, however, could not be properly termed "short" fiber. The short fiber found on the seed after ginning is caused by imperfect ginning, which can, in most instances, be traced to rapid ginning with a tight roll and where the saw has cut the fiber, and this fault may be eliminated in accordance with the present method of ginning, to wit, by the simultaneous utilization of an ordinary gin together with an ordinary linter, operating with suitable and common intermediary apparatus. The improved system results in the recovery of from twenty to forty pounds more lint per bale than that obtained by the ordinary system, and the lint thus obtained is in better condition and of a higher quality.

It is known that attempts have heretofore been made to accomplish the result obtained by the present method, but so far as known, all such attempts have been in the direction of removing, by successive operations, the lint or fiber from the seed, but at a detriment to the fiber; and have been either wholly inoperative or have resulted in no advantage as compared with the ordinary and accepted process of ginning. These faults are overcome by the present described process, which is characterized in that the cotton in the seed is maintained in a very loose roll during the first ginning operation, much looser than in ordinary ginning, and a like operation of maintaining a loose roll in the working of the linting machine.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent, is:

1. The process of ginning cotton which consists in first subjecting the seed cotton to a ginning operation while the same is maintained in a loose or open roll, and then subjecting the resulting partly ginned seed cotton to a linting operation while the same is maintained in a loose roll, substantially as set forth.

2. The process of ginning cotton which consists in first subjecting the seed cotton to a ginning operation while the same is maintained in a roll more loose or open than in ordinary ginning and so loose that the staple is uninjured by the saws revolving freely and easily through the bottom side of the roll, and then transferring the resulting partly ginned seed and subjecting the same to a linting operation to remove the remaining fiber while the same is maintained in a loose or open roll, substantially as set forth.

3. In an apparatus for ginning cotton, the combination of a plurality of gins for primarily ginning the seed cotton, a flue adapted to receive the cotton fiber, a linter adapted to receive the cotton seed from the several gins and remove the lint therefrom, and means for discharging the removed lint into said flue, substantially as set forth.

4. In an apparatus for ginning cotton, the combination of a plurality of gins for primarily ginning the seed cotton, a linter, a common flue adapted to receive the cotton fiber from the several gins, a conveyer common to the several gins adapted to receive the cotton seed discharged therefrom, a second conveyer for delivering the cotton seed from the first conveyer into the linter to remove the lint therefrom, and means for discharging the removed lint into said common flue, substantially as set forth.

5. In an apparatus for ginning cotton, the combination of a plurality of gins for primarily ginning the seed cotton, a common flue adapted to receive the cotton fiber from the several gins, a spiral conveyer common to the several gins adapted to receive the cotton seed discharged therefrom, a single linter, an elevator conveyer for delivering the cotton seed from the spiral conveyer into the linter to remove the lint therefrom, means for discharging the lint from the linters into said common flue, and means for discharging the cotton seed into said spiral conveyer, substantially as set forth.

In witness whereof, I have hereunto set my hand and seal at Dardanelle, Arkansas, this 13 day of July, A. D. nineteen hundred and sixteen.

CLABORN B. COTTON. [L. S.]

Witnesses:
L. C. ADAMS,
W. D. COTTON.

Copies of this patent may be obtained for five cents each, by addressing the "Commissioner of Patents, Washington, D. C."